(12) United States Patent
Gurunathan et al.

(10) Patent No.: US 7,106,449 B2
(45) Date of Patent: Sep. 12, 2006

(54) SYSTEMS AND METHODS FOR FIBER OPTIC DEVICES WITH REDUCED THERMAL SENSITIVITY

(75) Inventors: Mohan Gurunathan, San Francisco, CA (US); Richard D. Pering, Mountain View, CA (US); Bogdan Szafraniec, Sunnyvale, CA (US)

(73) Assignee: Agilent Technologies, Inc., Palo Alto, CA (US)

( * ) Notice: Subject to any disclaimer, the term of this patent is extended or adjusted under 35 U.S.C. 154(b) by 139 days.

(21) Appl. No.: 10/449,364

(22) Filed: May 30, 2003

(65) Prior Publication Data

US 2004/0239940 A1  Dec. 2, 2004

(51) Int. Cl.
*G01B 9/02* (2006.01)
(52) U.S. Cl. .......................... 356/477; 385/12
(58) Field of Classification Search ................ 356/477, 356/478; 385/12, 123; 250/227.19, 227.27
See application file for complete search history.

(56) References Cited

U.S. PATENT DOCUMENTS

| | | | |
|---|---|---|---|
| 4,772,083 A | 9/1988 | Ahmed | |
| 4,848,910 A | 7/1989 | Dupraz | |
| 4,918,492 A | 4/1990 | Ferdinand et al. | |
| 5,280,341 A | 1/1994 | Nonnenmacher et al. | |
| 5,311,279 A * | 5/1994 | Wendler | 356/477 |
| 5,761,357 A * | 6/1998 | Peck, Jr. | 385/44 |
| 6,212,323 B1 * | 4/2001 | Harpin et al. | 385/129 |
| 6,563,971 B1 | 5/2003 | Burton et al. | |
| 6,778,278 B1 * | 8/2004 | Ahmadvand et al. | 356/477 |
| 2002/0054294 A1 | 5/2002 | Ahmadvand et al. | |

FOREIGN PATENT DOCUMENTS

WO   WO02/065179   8/2002

* cited by examiner

*Primary Examiner*—Hwa (Andrew) Lee

(57) ABSTRACT

An optical fiber device with reduced thermal sensitivity comprises a first optical fiber arm having a first composite coefficient of thermal expansion and a first length and a second optical fiber arm having a second composite coefficient of thermal expansion and a second length. A ratio of the first and second lengths inversely matches a ratio of the first and second composite coefficients of thermal expansion to minimize thermal sensitivity in the device.

27 Claims, 2 Drawing Sheets

SYSTEMS AND METHODS FOR FIBER OPTIC DEVICES WITH REDUCED THERMAL SENSITIVITY

TECHNICAL FIELD

The present invention is generally related to optic devices and specifically related to systems and methods for fiber-optic devices with reduced thermal sensitivity.

BACKGROUND OF THE INVENTION

An interferometer is a device in which an optical interference pattern of fringes is formed and used to make measurements, typically related to the wavelength of the optical source. Interferometers may be used for monitoring relative wavelength changes of an optical source. In such wavelength-monitoring applications, interferometers may also be referred to as "wavecounters" or "wavemeters".

"Fiber interferometers" are interferometers constructed entirely using fiber-optic waveguides and fiber-optic components. FIG. 1 diagrammatically shows typical prior art fiber interferometer 100, which is based on a well known Michelson architecture. Interferometer 100 comprises fiber directional coupler 103 and Faraday rotator mirrors 106 and 107. Coupler leads 102 and 108 are connected to light source 101 and detector 109, respectively. Faraday rotator mirrors 106 and 107 are attached to coupler fiber leads 104 and 105. Some additional fiber (115) may also be spliced between coupler lead 104 (or 105), and Faraday mirrors 106 (or 107). The Faraday mirrors 106 and 107 reflect light from light source 101 back through arms 104 and 105, and these reflected signals are also exchanged and combined at coupling 103 and carried back through lead 108 to be detected by the optical sensor 109.

One of the main difficulties in using fiber interferometers is that, compared to free-space interferometers, they are more sensitive to changes in temperature. This thermal sensitivity arises because lengths of fiber expand appreciably with increasing temperature, while free-space, or air, expands comparably much less. Since stable operation of an interferometer depends on path length differences being stable, this thermal expansion of the fiber problematically causes thermal drift of the interferogram measurement.

Arm 120 of interferometer 100 comprises fibers 104 and 115 and lead 116 of Faraday mirror 106. Arm 121 comprises fiber 105 and lead 117 of Faraday mirror 107. The length of these arms, which are functions of the ambient temperature T, may be respectively designated as $L_1(T)$ and $L_2(T)$. Typically, all of the fiber used in interferometer 100 is of a uniform variety or construction, as is consistent with prior art interferometers. This fiber possesses a coefficient of thermal expansion (CTE) of $\alpha$ parts-per-million per degree Celsius (ppm/° C.), or equivalently, parts-per-million per degree Kelvin (ppm/° K). Based on thermal expansion theory:

$$L_1(T)=(1+\alpha T)\cdot L_1(0) \quad (1)$$

$$L_2(T)=(1+\alpha T)\cdot L_2(0) \quad (2)$$

where $L_1(0)$ and $L_2(0)$ are the lengths of the interferometer arms 120 and 121 extrapolated back to a temperature of zero degrees Kelvin. These equations show how each arm's length changes in direct proportion to the change in ambient temperature.

Thus, the path-length-difference of the two arms as a function of temperature, is:

$$\Delta L=L_2(T)-L_1(T) \quad (3)$$

which indicates that $\Delta L$, the path length difference between interferometer arms 120 and 121, is a function of the temperature T. Since $\Delta L$ is a function of temperature, the interferometer's output may drift with temperature.

BRIEF SUMMARY OF THE INVENTION

The present invention is directed to systems and methods which provide fiber-optic devices with reduced thermal sensitivity, including a fiber interferometer which has greatly reduced thermal drift, compared to previous devices. This reduced thermal sensitivity is provided through the use of fibers with different properties in the various arms of the present devices, such that the "composite" thermal expansion properties of the arms differ. Further, methods are provided below to determine the lengths of fiber required in each arm to make a thermally-stable fiber device, using optical fibers with known thermal properties in accordance with the present invention.

The foregoing has outlined rather broadly the features and technical advantages of the present invention in order that the detailed description of the invention that follows may be better understood. Additional features and advantages of the invention will be described hereinafter which form the subject of the claims of the invention. It should be appreciated by those skilled in the art that the conception and specific embodiment disclosed may be readily utilized as a basis for modifying or designing other structures for carrying out the same purposes of the present invention. It should also be realized by those skilled in the art that such equivalent constructions do not depart from the spirit and scope of the invention as set forth in the appended claims. The novel features which are believed to be characteristic of the invention, both as to its organization and method of operation, together with further objects and advantages will be better understood from the following description when considered in connection with the accompanying figures. It is to be expressly understood, however, that each of the figures is provided for the purpose of illustration and description only and is not intended as a definition of the limits of the present invention.

BRIEF DESCRIPTION OF THE DRAWINGS

For a more complete understanding of the present invention, reference is now made to the following descriptions taken in conjunction with the accompanying drawing, in which.

DETAILED DESCRIPTION

Figure 1:
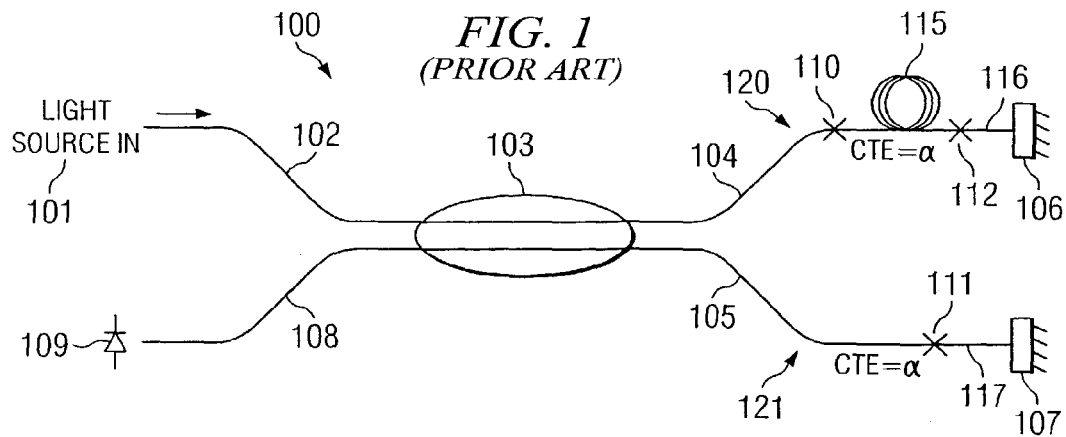
FIG. 1 is a diagrammatic illustration of a prior art fiber interferometer.

In accordance with the present systems and methods, thermal properties a coating and/or connected material(s) imbue to an optical fiber may be used to thermally stabilize an optical fiber based device from first-order expansion effects. The present invention is particularly well suited for use in optical fiber interferometers.

Optical fiber is made up of different layers. The core and cladding of optical fiber are typically silica glass. Light typically propagates and stays confined within the core region. The silica is fragile so it is coated with several layers of resilient material, such as plastic. Typically, the coatings applied have thermal expansion properties which are very different than the glass. As a result the entire fiber does not exhibit thermal behavior like glass alone; it behaves as a composite structure whose overall thermal properties are determined by some combination of the properties of the glass and of its coatings. Embodiments of the present invention use differently coated fibers in the arms of an interferometer, or the like, to provide a difference in the composite CTEs between the arms. Typically, the fiber assemblies chosen for the arms exhibit different rates of thermal expansion. The different types of fiber used in these assemblies may have different radii and/or different coatings. Furthermore, the fibers may be commercially available fibers from different vendors, or the fibers may be custom-made. Other embodiments physically manipulate at least one fiber to provide a difference in the composite CTEs between the arms, wherein the aforementioned assemblies may include other materials attached to the fiber to alter its thermal properties.

The present systems and methods for reduced thermal sensitivity fiber devices have a broad range of applications, including matching of optical propagation delays in fiber-optic paths, and wavelength monitoring in telecommunication systems.

Herein, "first-order" thermal behavior is intended to relate to dominant behavior of a material as described by thermal expansion theory. Mathematically, this indicates that a material's length in any dimension changes in direct proportion to the change in temperature of that material. The constant of proportionality of this change is known as the Coefficient of Thermal Expansion (CTE). Furthermore, the average CTE of a group of connected components, such as fibers, coatings, splices, and other parts, will henceforth be called the "composite Coefficient of Thermal Expansion" for that arrangement of connected components, or "composite CTE", herein. Other, non-dominant and more mathematically involved thermal behaviors of materials exist. These effects, such as hysteresis, creep, and stress-relaxation, are not considered "first-order" behaviors herein. Furthermore, the effect of refractive index variation versus temperature will be considered negligible herein. Embodiments of the present invention mitigate thermal drift problems for many optical fiber applications, including fiber interferometer thermal drift, by addressing first order behaviors.

The following example is presented for an optical fiber interferometer with two differently coated fiber arms, $L_1$ and $L_2$. Calling the composite CTE for the first fiber arm $\alpha_1$ and $\alpha_2$ for the second fiber arm, the proper length of the two arms of the interferometer are selected as detailed below. Normally, in the design of an interferometer the first item of concern is the free spectral range (FSR), which is the periodicity of the fringes that the interferometer provides when sweeping a wavelength of light input. The FSR of an interferometer determines how much the input optical source frequency should be swept to derive a difference between two peaks at the output of the interferometer, and can be expressed in megahertz (frequency) or nanometers (wavelength). In designing an interferometer in accordance with the present invention, $L_2$ minus $L_1$, or the path length difference $\Delta L$, is chosen based on the desired FSR. In accordance with the present system and methods for thermal stabilization using two different types of fiber, there is a second consideration related to $L_2$ and $L_1$, as discussed below.

Assuming two lengths of differently coated fiber $L_1$ and $L_2$, with composite CTEs of $\alpha_1$ and $\alpha_2$, respectively, equations (1) and (2) from above may be restated:

$$L_1(T) = (1 + \alpha_1 T) \cdot L_1(0) \tag{4}$$

$$L_2(T) = (1 + \alpha_2 T) \cdot L_2(0) \tag{5}$$

Therefore, the path length difference over temperature can be expressed as a function of temperature as follows:

$$\begin{aligned}\Delta L &= L_2(T) - L_1(T) \\ &= L_2(0) \cdot (1 + \alpha_2 T) - L_1(0) \cdot (1 + \alpha_1 T) \\ &= \{L_2(0) - L_1(0)\} + \{\alpha_2 L_2(0) - \alpha_1 L_1(0)\} T\end{aligned} \tag{6}$$

Equation (6) comprises a constant term and a temperature-dependent term. The temperature-dependent term, $\{\alpha_2 L_2(0) - \alpha_1 L_1(0)\}$, can be eliminated by choosing $L_1$ and $L_2$ so that:

$$\frac{\alpha_2}{\alpha_1} = \frac{L_1(0)}{L_2(0)} \tag{7}$$

If the relationship in equation (7) is made true, the path difference, $\Delta L$, is made independent of the temperature T. Therefore, if appropriate lengths and coatings of fiber are chosen for each arm, such that Equation (7) is made true, a fiber interferometer can be made insensitive to temperature, at least to first-order.

This result can be generalized for optical devices with more than two fiber arms, in which the relative length differences between all the arms remains stable versus temperature. An example is a situation where there are more than two fiber arms, with various lengths $L_1(T), L_2(T), \ldots L_n(T)$. If the composite CTE $\alpha_i$ of each fiber $L_i$ is individually modified (through coating, structural modification, or other means) such that:

$$\alpha_1 L_1(0) = \alpha_2 L_2(0) = \ldots = \alpha_n L_n(0) \tag{8}$$

then, the relative length differences between all the arms will remain stable versus temperature. In other words, thermal stability between the length of any two fibers may be achieved when the product of each fiber's zero-Kelvin length and its composite CTE are equal.

Whereas, the equations above reference the measurement of arms $L_1$ and $L_2$ at a temperature of zero Kelvin, in practical settings, the zero-Kelvin length of a material is not directly available. However, the zero-Kelvin length may be extrapolated from a measured length at another temperature, using the relationships embodied by equations (4) and (5). Using such an extrapolation, equation (7) can be restated in terms of the measured lengths of fibers $L_1$ and $L_2$ at any given temperature t:

$$\frac{\alpha_2(1+\alpha_1 t)}{\alpha_1(1+\alpha_2 t)} = \frac{L_1(t)}{L_2(t)} \quad (9)$$

This relationship is equivalent to that expressed in equation (7). Therefore, if the relationship in equation (9) is made true by proper selection of $\alpha_1$, $\alpha_2$, $L_1$ and $L_2$ at temperature t, this will also result in thermal stabilization of the optical device.

Figure 2:
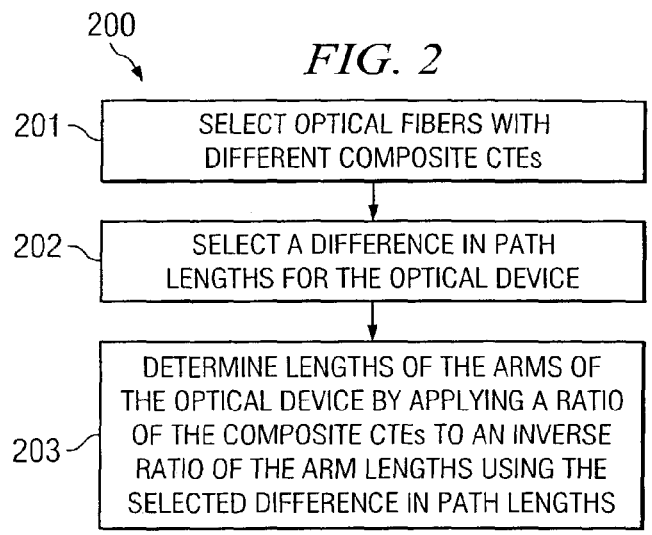
FIG. 2 is a flow chart of a method for providing an optical fiber device with reduced thermal sensitivity in accordance with the present invention.

Turning to FIG. 2 an embodiment in accordance with the present invention of method 200 for producing a thermally stabilized optical fiber device is shown. From a practical standpoint, the properties of fiber coatings may not be directly selectable. However, two "off-the-shelf" fibers with distinctly different coatings may be obtained and used in conjunction with a fiber coupler and other components to construct a thermally stable fiber device, such as a fiber interferometer. At 201 two types of off-the-shelf fiber with previously determined composite CTE's, $\alpha_1$, and $\alpha_2$ are selected for the device. At box 202, the nominal path length difference, $\Delta L = L_2 - L_1$ is selected for the optical device. The selection at 202 may be based, at least in part, on functional characteristics of the device. To thermally stabilize the optical device the proper lengths $L_1$ and $L_2$ are derived at 203 by solving a system of two equations, the nominal path length difference, $\Delta L = L_2 - L_1$ selected at 202 and the inverse ratio of CTE's and path lengths of equation (7) or (9). This method suggests that the fiber that has the higher thermal coefficient should be in the shorter arm, the length of which may be dictated by the application. Conversely, the fiber that has the lower thermal coefficient should be in the longer arm, an inverse relationship.

Figure 3:
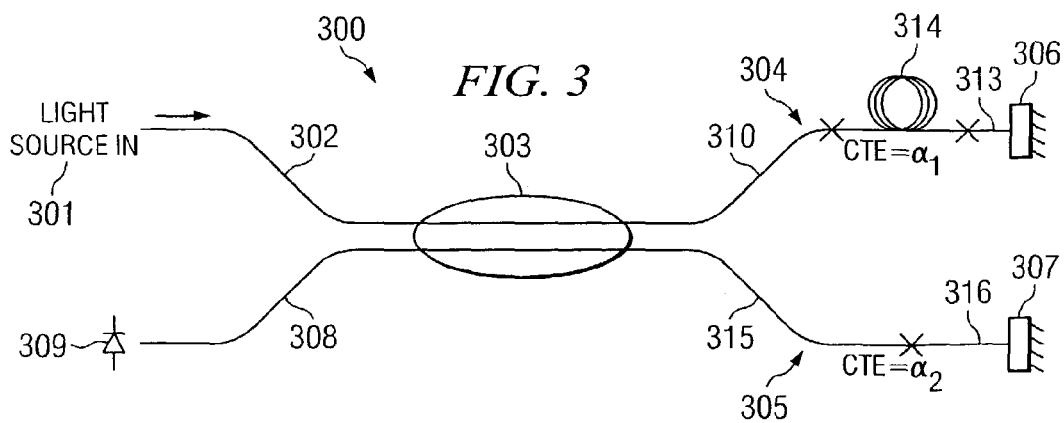
FIG. 3 is a diagrammatic illustration of a fiber interferometer embodiment employing a two-by-two optical fiber coupler in accordance with the present invention.

Turning to FIG. 3, embodiment 300 of a Michelson fiber interferometer with reduced thermal sensitivity is diagrammatically illustrated. Michelson interferometer 300 is shown constructed using two-by-two coupler 303. Typically, an optical fiber coupler has fiber leads extending from it. For example, a two-by-two coupler has two input leads and two output leads. Alternatively, these leads may be described as two input fibers and two output fibers. Once an interferometer is built using a coupler the term "arm" is used to describe the leads and any fiber spliced directly, or indirectly, to the leads to construct the interferometer. For example, in FIG. 3 Michelson interferometer arms 304 and 305 extend between coupler 303 and Faraday mirrors 306 and 307. Illustrated interferometer arm 304 is are made of coupler lead 310, spliced to additional fiber 314, which is spliced to pigtail lead 313 extending from Faraday mirror 306. Arm 305 is shown as comprised of lead 315 extending from coupler 303 spliced to pigtail lead 316 of Faraday mirror 307. Alternatively, each arm, 304 and/or 305, may have fiber spliced into it to adjust the interferometer's FSR in accordance with the present invention.

Tracing the path of light through interferometer 300, from light source 301, light enters and/or is injected into, input arm 302, which as illustrated is a lead of coupler 303. The light then passes into coupler 303. Over the length of coupler 303, power from light source 301 that is entering via arm 302 couples (or partially transfers) from lead 302 to lead 315. Typically, as a result of this coupling, the light source power equally splits between leads 310 and 315 and exits equally in arms 304 and 305. The optical power entering coupler 303 is an oscillating electromagnetic field. As a result of conservation of energy, the two oscillating fields typically depart from coupler 303, via arms 304 and 305, 90-degrees out of phase.

In the longer arm 304, of length $L_1$, the light travels through coupler lead 310 and the long length of fiber 314, and reflects from Faraday mirror 306, which is spliced to fiber 314 (through pigtail 313). The light returns back through arm 304 into coupler 303. The light traveling through the shorter arm 305, of length $L_2$, shown in FIG. 3 as comprised of spliced coupler lead 315 and Faraday mirror lead 316, reflects from Faraday mirror 307 and returns through arm 305 into fiber optic coupler 303. When the reflected light sources are returned to fiber optic coupler 303 they interfere. Since the light travels two different path lengths, $L_1$ and $L_2$, the phase difference of the light that is returned from the two different paths will vary with the optical wavelength. The resulting optical interference at the coupler causes a wavelength dependent power split between coupler leads 302 and 308. Consequently, as wavelength changes the intensity detected at detector 309 varies. For example, if input 301 is changing in wavelength uniformly, such as light produced by a laser that is being linearly tuned in wavelength, the output of a photodiode detector at 309 varies sinusoidally. Every full cycle of the resulting sinusoid corresponds to the wavelength change as expresses in units equal to one FSR of the interferometer. Thus, the change in wavelength at 301 can be measured at 309.

Figure 4:
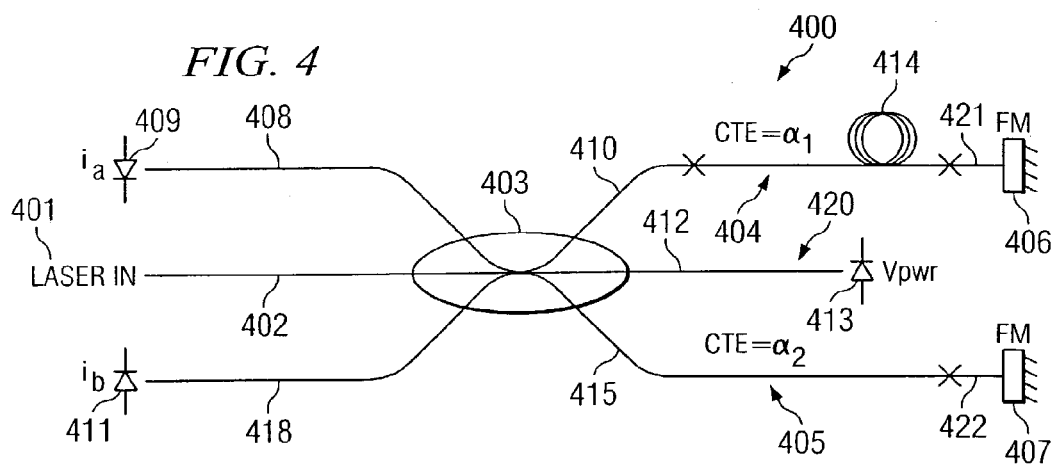
FIG. 4 is a diagrammatic illustration of a fiber interferometer embodiment employing a three-by-three optical fiber coupler in accordance with the present invention.

Turning to FIG. 4, three-by-three coupler based fiber interferometer 400 in accordance with the present invention is shown. Principal operation of three-by-three coupler based interferometer 400 is similar to two-by-two coupler based interferometer 300 of FIG. 3. Three-by-three coupler 403 comprises three fibers fused in very close proximity and/or fused together. Resultantly, three-by-three coupler 403 has three input leads 408, 402 and 418, and three output leads 410, 412 and 415. Arm 404 of interferometer 400 is made up of lead 410, fiber 414, pigtail 421 of Faraday mirror 406 and the splices connecting these fibers. Similarly, arm 405 is made up of lead 415 and at least pigtail 422 of Faraday mirror 407, as well as the splice connecting them. Center arm 420, as illustrated, is comprised of lead 412.

When light from light source 401 enters interferometer 400 through lead 402, shown as a center tap in FIG. 4, the light couples equally to the other two fibers. Thereby, equal amounts of power exit coupler 403 in each of leads 410, 412 and 415. Phase shifting in a three-by-three coupler is different than in a two-by-two coupler. There is a coupling related 120 degree phase shift between leads 402 and 410 and 415. Light waves in fiber leads 410 and 415 undergo a 120 degree phase shift due to coupling (cross coupled waves), while the light wave in fiber 412 is not phase shifted. Thus, the light waves that leave coupler 403 on fiber leads 410 and 415 have a phase relation of 120-degrees relative to the light waves in lead 412, and the light wave on each of fiber leads 410, 412 and 415 has one-third of the power from light source 401.

Light traveling down center lead 412 may be received by photo-detector 413 that may be acting as a power detection photo-detector. This might provide a signal that maybe used to derive the average power of light source 401. The other two output leads 410 and 415 are used for interferometer functions, similar to leads 310 and 315 in two-by-two coupler embodiment 300. As illustrated in FIG. 4, interferometer arm 404 may comprise length of fiber 412 spliced between lead 410 and Faraday mirror 406, while coupler lead 415 may be used as interferometer arm 405. The light waves travel down the different path lengths of arms 404 and 405 and reflect from Faraday mirrors 406 and 407, respectively, and return to three-by-three coupler 403 where cross-coupled waves experience an additional 120-degree phase shift and are received by photo-detectors 409 and 411 via arms/leads 408 and 418, respectively. As the wavelength of light input 401 changes linearly, a sinusoidally varying electrical current is generated at photo-detectors 409 and 411. In three-by-three coupler based interferometer 400, because of the 120-degree phase shift, as opposed to a 90-degree phase shift in a two-by-two coupler, the direction of change of the wavelength of light may be derived. For example, the current $i_a$ and $i_b$ of the two photo-detectors 409 and 411 have a certain phase relationship due to the 120-degree phase shift property of coupler 403. As a result, if the wavelength is increasing, the current $i_a$ leads $i_b$ by 120-degrees, and if the wavelength is decreasing, the current of $i_b$ leads $i_a$ by 120-degrees. So, by observing the phasing of these two signals, the direction of wavelength change may be inferred.

Figure 5:
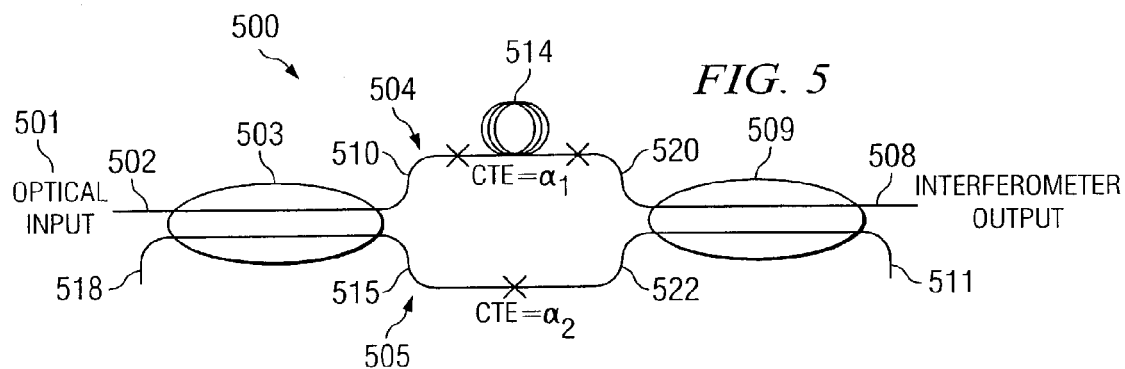
FIG. 5 is a diagrammatic illustration of a Mach-Zender fiber interferometer embodiment in accordance with the present invention.

FIG. 5 is a diagrammatic illustration of a thermally stabilized Mach-Zender interferometer embodiment 500 in accordance with the present invention. In structure Mach-Zehnder fiber interferometer 500 comprises two two-by-two couplers 503 and 509. Output leads 510 and 515 of coupler 503 are connected to input leads 520 and 522 of coupler 509, respectively. Additional fiber 514 can be spliced between leads 510 and 520 to form upper arm 504 of the interferometer while leads 515 and 522 may be spliced together to form lower arm 505. In accordance with the present invention the difference in lengths between interferometer arms 504 and 505 determines the FSR of interferometer 500.

Tracing the path of light through interferometer 500 from light source 501, light enters input lead/arm 502 and passes into first optical fiber coupler 503. Over the length of coupler 503 power from light source 501 that is entering via arm/lead 502 partially transfers from lead 502 to lead 515 and ideally the light source power equally splits between leads 510 and 515 and exits equally in arms 504 and 505. The light-wave entering coupler 503 is also an oscillating electromagnetic field. In two-by-two coupler 503 the cross-coupled wave experiences a 90-degree phase shift as a result of conservation of energy. In arm 504 the light travels through the longer length of fiber path $L_1$ while the light in arm/lead 505 travels through the shorter length $L_2$. When the light traveling through arms 504 and 505 enter second fiber optic coupler 509, the optical waves recombine and interfere. Thus, depending on the waves' relative phasing, the optical power split between output leads 508 and 511 varies. Consequently, the optical power detected in lead 508 at a photo-diode or the like is wavelength dependent.

Figure 6:
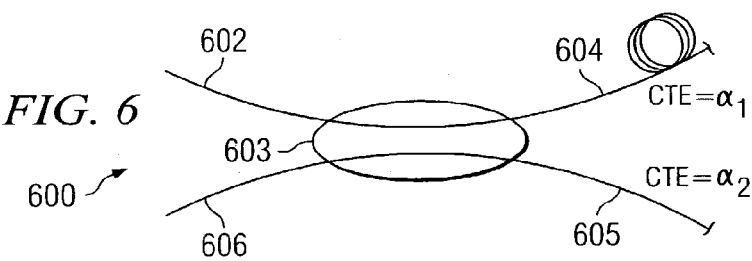
FIG. 6 is a diagrammatic illustration of a specially adapted fiber optic coupler fabricated from two different fiber types, in accordance with an embodiment of the present invention.

FIG. 6 is a diagrammatic illustration of reduced thermal sensitivity optical fiber coupler 600. Reduced thermal sensitivity coupler 600 is made using two different fibers with different CTEs, such as fibers having different coatings. Reduced thermal sensitivity coupler 600 is typically made by stripping a small area of coating from two fibers with different CTEs, and fusing the fiber together at the stripped regions. Once such a coupler is made it can be used to build a thermally stabilized fiber interferometer, such as a Michelson fiber interferometer, by splicing Faraday mirrors to the coupler's leads, similar to the embodiment shown in FIG. 3. Reduced thermal sensitivity coupler 600 provides an "off the shelf" solution in accordance with the present invention. Reduced thermal sensitivity coupler 600 is comprised of a first fiber having a composite CTE of $\alpha_1$, typically a relatively lower composite CTE. This first fiber makes up leads 602 and 604. The other two leads, 605 and 606, are made up of a second fiber with a different composite CTE, $\alpha_2$, typically a larger composite CTE than the fiber of leads 602 and 604. These fibers are fused in coupling body or region 603. Typically, at least one lead, by way of example lead 604, typically comprised of the fiber with the relatively lower composite CTE, is longer as compared to the other lead(s), in this example, lead 605, which has a higher relative composite CTE. However, each of these leads is typically of sufficient length to permit a fiber interferometer to be constructed from reduced thermal sensitivity coupler 600 by cutting fiber from the leads to form interferometer arms and attaching mirrors, or one or more additional couplers, as necessary. Alternatively, lengths of matching fibers may be spliced to leads 604 (and 605) to construct a fiber interferometer. To construct a Mach-Zender interferometer, a second reduced thermal sensitivity coupler may be spliced to a first reduced thermal sensitivity coupler, similar to as shown in FIG. 5.

The lengths for the arms for a thermally stabilized interferometer constructed from reduced thermal sensitivity coupler 600 may be determined using equation (7) or (9) above, wherein the CTEs, $\alpha_1$ and $\alpha_2$, are known and the path difference $\Delta L = L_2 - L_1$ may be dictated by the FSR, and/or other functional requirements for the interferometer. Alternatively, a table or set of tables could be supplied with reduced thermal sensitivity coupler 600 to aid in selecting arm lengths for a desired FSR. For example, tables could be supplied with a reduced thermal sensitivity coupler that, for a particular FSR, tabulated $L_1$ and $L_2$.

Figure 7:
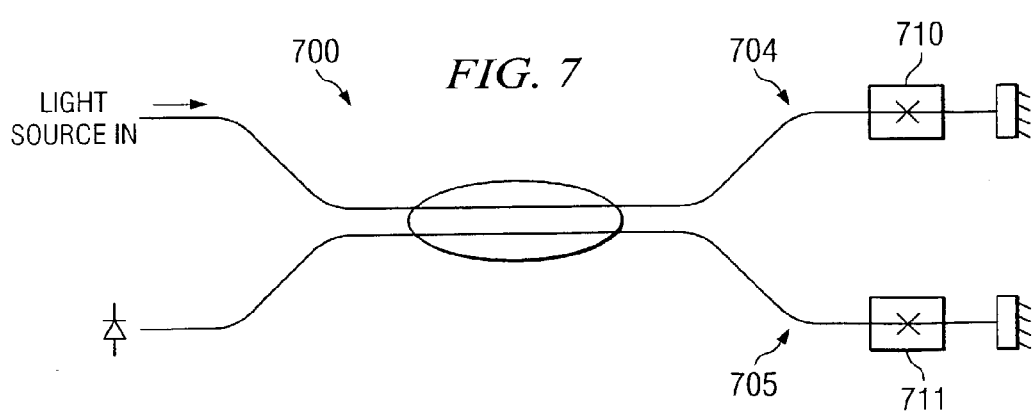
FIG. 7 is a diagrammatic illustration of a fiber interferometer embodiment employing a two-by-two optical fiber coupler and splice protector stretchers in accordance with an embodiment of the present invention.

FIG. 7 illustrates thermally stable fiber interferometer 700, which uses the same types of fibers in both arms 704 and 705 with rigid structure(s) 710 (and/or 711) attached to the fiber of arms 704 (and/or 705). Rigid structure(s) 710 (and/or 711) stretch and differentiate one or both of the fibers' lengths, thereby providing different relative CTEs in the fibers. Rigid structures 710 and 711 may be special splice protectors disposed over the splices on the different arms of the interferometer, as diagrammatically illustrated in FIG. 7. For example, splice protector 710 on interferometer arm 704 preferably expands faster with temperature than splice protector 711 on arm 705. As a further example a splice protector (710) may only be disposed over the splice on arm (704) with no protector disposed over the splice on the other arm (705). In this example, when protector 710 expands, it provides a different composite CTE to the fiber of arm 704, relative to the fiber of arm 705. Alternatively, a rigid bar, rigidly attached to the fiber of one or both arms may be used to differentially stretch the fiber of the arms. Thermal expansion properties of the splice protectors or bars are typically known or can be measured. The resulting effective CTEs $\alpha_1$ and $\alpha_2$ that incorporate different thermal expansion of different segments of interferometer arms may be used to derive the necessary lengths $L_1$ and $L_2$.

Although the present invention and its advantages have been described in detail, it should be understood that various changes, substitutions and alterations can be made herein without departing from the spirit and scope of the invention as defined by the appended claims. Moreover, the scope of the present application is not intended to be limited to the particular embodiments of the process, machine, manufacture, composition of matter, means, methods and steps described in the specification. As one of ordinary skill in the art will readily appreciate from the disclosure of the present invention, processes, machines, manufacture, compositions of matter, means, methods, or steps, presently existing or later to be developed that perform substantially the same function or achieve substantially the same result as the corresponding embodiments described herein may be utilized according to the present invention. Accordingly, the appended claims are intended to include within their scope such processes, machines, manufacture, compositions of matter, means, methods, or steps.

What is claimed is:

1. An optical fiber device with reduced thermal sensitivity comprising:
   a first optical fiber arm having a first composite coefficient of thermal expansion and a first length; and
   a second optical fiber arm having a second composite coefficient of thermal expansion and a second length, said second length selected to reduce thermal sensitivity in said device.

2. The device of claim 1 wherein a ratio of said first and second lengths inversely matches a ratio of said first and second composite coefficients of thermal expansion to minimize thermal sensitivity in said device.

3. The device of claim 1 further comprising a first coupler coupling said first and second arms.

4. The device of claim 3 further comprising a second coupler, spaced apart from said first coupler, said second coupler coupling said first arm to said second arm.

5. The device of claim 1 further comprising at least one additional optical fiber arm coupled to said first and second arms.

6. The device of claim 5 further comprising a first coupler coupling said first, said second and said at least one additional arms.

7. The device of claim 6 further comprising a second coupler coupling leads spliced to said first arm, said second arm and said at least one additional arm.

8. The device of claim 5 wherein, said at least one additional arm has a same composite coefficient of thermal expansion as one of said first and second arms.

9. The device of claim 5 wherein each of said at least one additional arms have a composite coefficient of thermal expansion differing from said composite coefficients of thermal expansion of said first and second arms.

10. The device of claim 1 wherein said device is an optical fiber interferometer.

11. The device of claim 10 wherein said lengths of said arms are chosen to give a required free spectral range to said interferometer.

12. The device of claim 1 wherein at least one of said arms comprise a plurality of fiber sections and said composite coefficient of thermal expansion of at least one of said arms comprises thermal expansion contributed by all of said fiber sections.

13. The device of claim 12 wherein said fiber sections are joined using splices and said composite coefficient of thermal expansion comprises thermal expansion contributed by said splices.

14. The device of claim 13 wherein said composite coefficient of thermal expansion comprises thermal expansion contributed by splice protectors.

15. The device of claim 1 wherein at least one of said coefficients of thermal expansion is modified by material attached to at least one of said fiber arms.

16. The device of claim 1 wherein at least one of said coefficients of thermal expansion is modified by at least one structure attached to at least one of said fiber arms.

17. The device of claim 16 wherein said structure is an optical fiber splice.

18. The device of claim 16 wherein said structure is an optical fiber splice protector.

19. A method for providing an optical fiber device with reduced thermal sensitivity comprising:
   selecting a plurality of optical fibers with different composite coefficients of thermal expansion;
   selecting a difference in lengths between first and second output arms of said device; and
   determining lengths of said first and second output arms by inversely matching a ratio of said first and second lengths to a ratio of said first and second composite coefficients of thermal expansion.

20. The method of claim 19 wherein said device is an optical fiber interferometer.

21. A reduced thermal sensitivity optical fiber coupler, said reduced thermal sensitivity coupler comprising:
   a first optical fiber with a first composite coefficient of thermal expansion;
   a second optical fiber with a second composite coefficient of thermal expansion; and
   a coupling region joining said first optical fiber and said second optical fiber such that an optical signal on one fiber is coupled between said fibers;
   wherein at least one of said fibers is of a length to provide a difference in arm lengths and reduced thermal sensitivity in a device incorporating said coupler.

22. The reduced thermal sensitivity coupler of claim 21 wherein lengths of output leads of said fibers are adapted to be cut to provide said difference in arm lengths in a interferometer comprised of said reduced thermal sensitivity coupler.

23. The reduced thermal sensitivity coupler of claim 21 wherein said fibers are adapted to receive spliced additional lengths of matching fibers to provide said difference in arm lengths in an interferometer comprising said reduced thermal sensitivity coupler.

24. The reduced thermal sensitivity coupler of claim 21 further comprising at least one additional optical fiber.

25. The reduced thermal sensitivity coupler of claim 24 wherein, said at least one additional fiber has a same composite coefficient of thermal expansion as one of said first and second fibers.

26. The reduced thermal sensitivity coupler of claim 24 wherein said at least one additional fiber has a composite coefficient of thermal expansion differing from said first and second composite coefficients of thermal expansion.

27. The reduced thermal sensitivity coupler of claim 21 wherein said first fiber has a first output lead length and second fiber has a second output lead length.

* * * * *